March 17, 1959     G. FRIZ     2,877,869
BRAKE FOR VEHICLES

Filed Jan. 26, 1953     4 Sheets—Sheet 1

INVENTOR
Gerhard Friz

March 17, 1959 G. FRIZ 2,877,869
BRAKE FOR VEHICLES
Filed Jan. 26, 1953 4 Sheets-Sheet 2
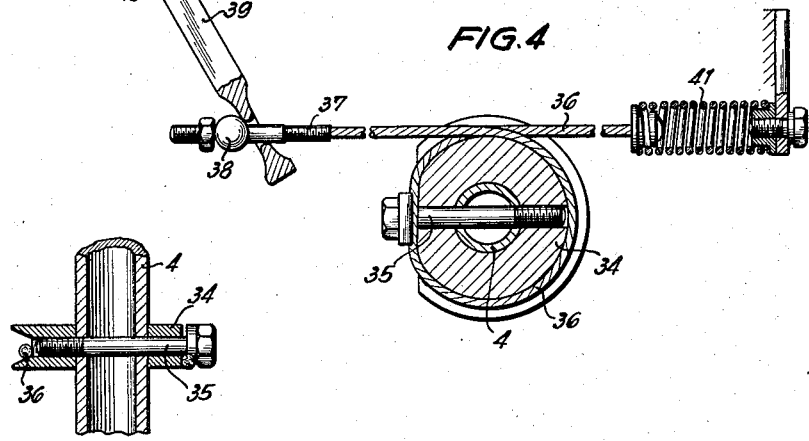
FIG. 4
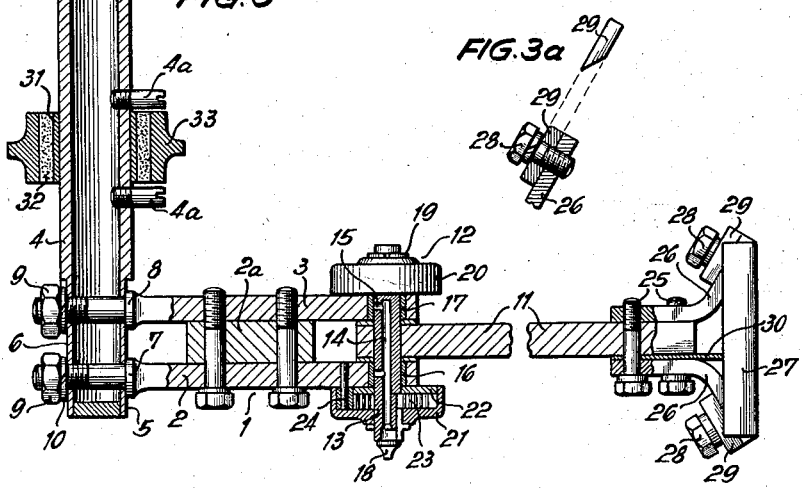
FIG. 3
FIG. 3a
INVENTOR
Gerhard Friz
By Walther Buhr
Patent Agent March 17, 1959 G. FRIZ 2,877,869
BRAKE FOR VEHICLES
Filed Jan. 26, 1953 4 Sheets-Sheet 3
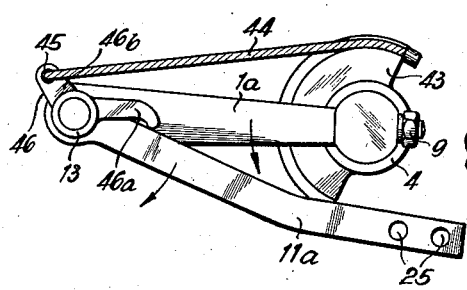
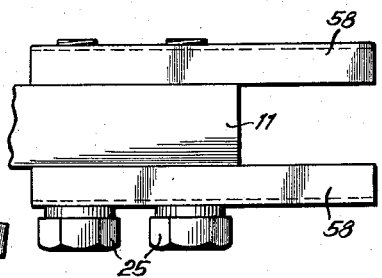
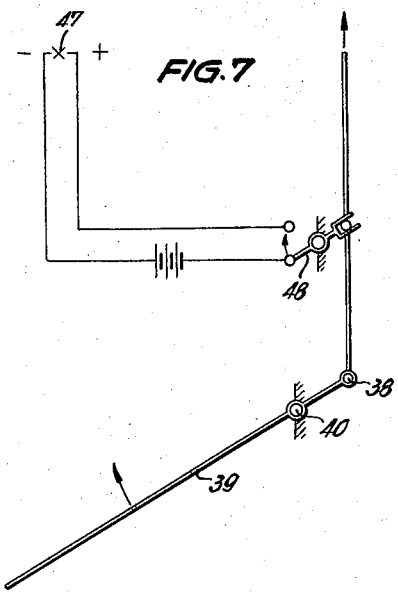
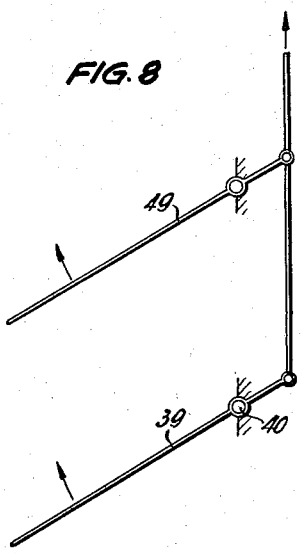
INVENTOR
Gerhard Friz
By
Patent Agent March 17, 1959 — G. FRIZ — 2,877,869
BRAKE FOR VEHICLES
Filed Jan. 26, 1953 — 4 Sheets-Sheet 4

INVENTOR
Gerhard Friz
By Walter Becker
Patent Agent

United States Patent Office 2,877,869
Patented Mar. 17, 1959

2,877,869

BRAKE FOR VEHICLES

Gerhard Friz, Tegernsee, Germany, assignor to Safe Stop Corporation, New York, N. Y.

Application January 26, 1953, Serial No. 333,107

Claims priority, application Germany January 29, 1952

4 Claims. (Cl. 188—5)

The present invention relates to brakes and, more particularly, to emergency brakes, especially for motor vehicles.

It is a well known fact that in certain instances, for instance, when sliding on icy or slippery roads, the normal vehicle brake is not only ineffective but it is even dangerous to apply the same. Therefore, various types of brakes have been suggested to meet such emergencies. Thus it has been proposed to use brake shoes of different types in order to be able quickly to brake a vehicle. According to one of these known constructions, a brake shoe is placed in the angle formed by the road and the wheel to be braked. This type of braking has the drawback that all of the braking forces have to be conveyed to the vehicle through the wheel, the wheel axle, and the springs for the wheel and axle, while only a portion of the wheel-ground pressure acts as load on the wheel so that in certain instances the brake shoe is pushed back and slides in front of the wheel to be braked without exerting any material braking effect.

In order to overcome this drawback it has been suggested to replace the brake shoe by chains which are thrown in front of the wheel to be braked and upon which the wheel rolls during the braking action. With the heretofore known braking devices of this type there exists the danger that, since the chain arrangement is not guided, the chain assembly is pushed sidewardly so that it cannot eb effective at all. Furthermore, with these known arrangements it is necessary that, after effective braking operation, the driver leave the vehicle in order to pick up the chain assembly. It is obvious that such an arrangement is infeasible in traffic.

Another drawback of the heretofore known emergency braking devices for vehicles consists in that they require considerable space so that they could be used only in connection with large vehicles such as trucks, whereas they were not applicable to passenger cars unless considerable alterations were effected which, of course, was impractical or practically impossible.

It is, therefore an object of the present invention to provide an emergency brake, especially for motor vehicles, which will overcome the above-mentioned drawbacks.

It is another object of this invention to provide an emergency brake, especially for motor vehicles, which after operation will automatically return into operative position.

It is a further object of this invention to provide an emergency brake, especially for motor vehicles, which will make it possible to convey the braking forces directly to the vehicle frame or chassis while avoiding the wear of the wheel, wheel axle and the springs therefor, to the greatest extent, and while fully taking advantage of the load produced by the wheel-ground pressure.

It is also an object of the present invention to provide an emergency brake of the type set forth in the preceding paragraphs which will require a minimum of space and thus can easily be installed in passenger cars, even in those of small size, without requiring any changes in the construction of the vehicle.

Still another object of the present invention consists in the provision of an emergency brake, especially for motor vehicles, which may be operated from different points of the vehicle.

Still another object of this invention consists in the provision of an emergency brake, particularly for motor vehicles, which may be coupled to the normal vehicle brake.

It is another object of this invention to provide an emergency brake of the type set forth above which is sturdy, can easily be manufactured and is rather inexpensive.

These and other objects and advantages of the invention will appear more clearly from the following specification in connection with the accompanying drawings, in which:

Figure 3 illustrates a horizontal cross section through the emergency brake according to the invention.

Figure 3a illustrates a detail of the brake.

Figure 4 illustrates, partly in section, the actuating mechanism for the brake.

Figure 5 is a side view of the brake according to the invention, provided with means for positively spreading the brake arms.

Figure 6 is a diagrammatic illustration for the connection of the braking elements proper with the braking device.

Figures 7 and 8 diagrammatically illustrate two ways of connecting the braking lever with the brake.

Figure 9:
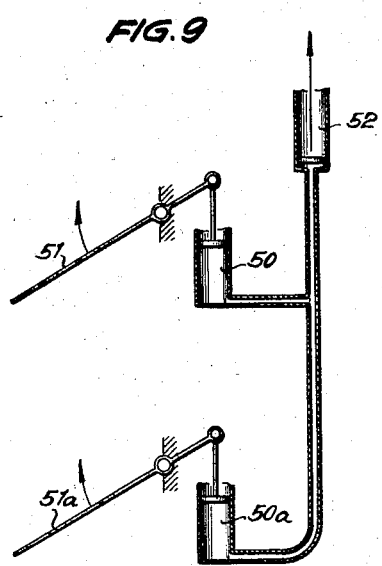
Figure 10:
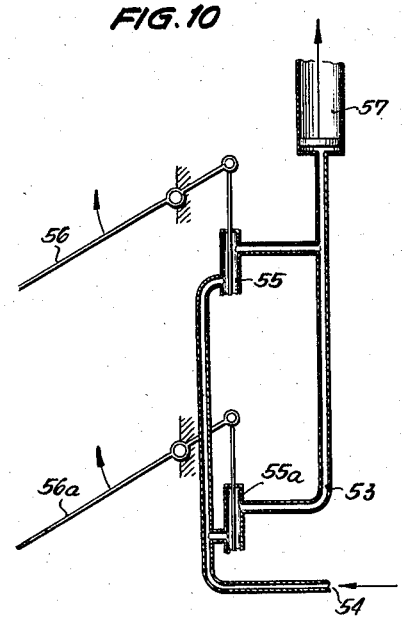

Figures 9 and 10 are diagrammatic illustrations of hydraulic actuating means for actuating the brake.

Figure 11:
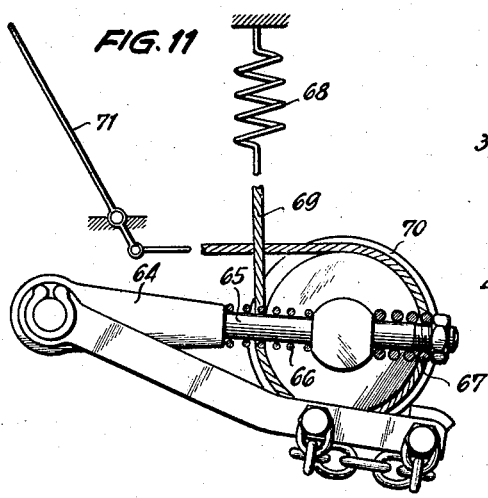

Figure 11 is a diagrammatic illustration of a further embodiment of the invention.

Figure 12:
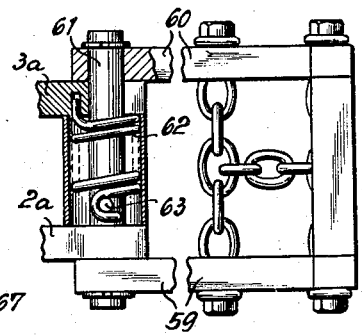

Figure 12 is a top view, partially in section, of the free end portion of the brake shown in Figure 11.

General arrangement

The brake according to the present invention comprises similar to a human arm, an upper arm, a lower arm, and a joint similar to the elbow joint of a human arm which interconnects the upper arm and the lower arm. The upper arm is, through the intervention of a shaft extending transverse to the longitudinal direction of the vehicle, adapted to be rotated so that both the upper arm and the lower arm are adapted to rotate together. The free end of the lower arm carries the actual braking elements adapted frictionally to engage the ground over which the vehicle is travelling. The arrangement is such that, when the brake is actuated by rotation of the said shaft, first the upper and lower arm travel together through a certain angle until the free end of the lower arm engages the tire of the wheel to be braked, whereupon the tire forces the free arm downwardly into engagement with the ground and transfers to said free end the load of the vehicle, thus bringing said lower arm and the braking elements connected thereto into the maximum frictional engagement with the ground while the braking forces are conveyed to the vehicle frame or chassis directly through the lower and upper arm of the vehicle.

Structural arrangement

Referring now to the drawings in detail and Figures 1 to 4 thereof in particular, the braking device shown therein comprises an upper arm generally designated 1 and composed according to Figure 3 of two members 2 and 3 spaced by a spacer 2a which may be connected to the members 2 and 3 in any desired manner, for instance, by bolts or by welding. The upper end of arm 1 is connected in any convenient manner with a hollow shaft 4. According to the particular construction shown in Figure 3, the hollow shaft 4 has flattened portions 5 and 6 while the members 2 and 3 are provided with a collar 7 and 8 abutting the flattened portion 5. The uppermost end of the members 2 and 3 is provided with a thread and engaged by a nut 9 which through the intervention of a spring washer 10 firmly connects the members 2 and 3 to the hollow shaft 4.

Figure 1:
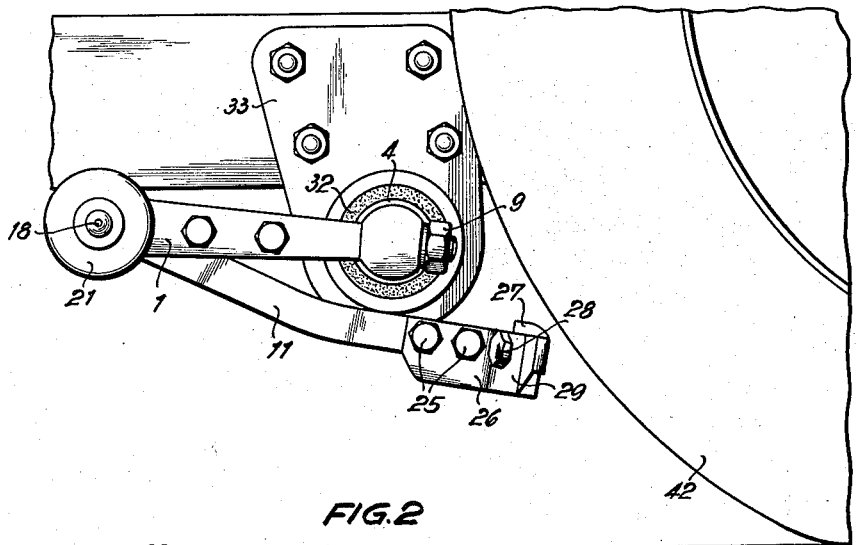
Figure 1 illustrates a side view of the emergency brake according to the invention mounted on a vehicle, the emergency brake being shown in its ineffective position.
Figure 2:
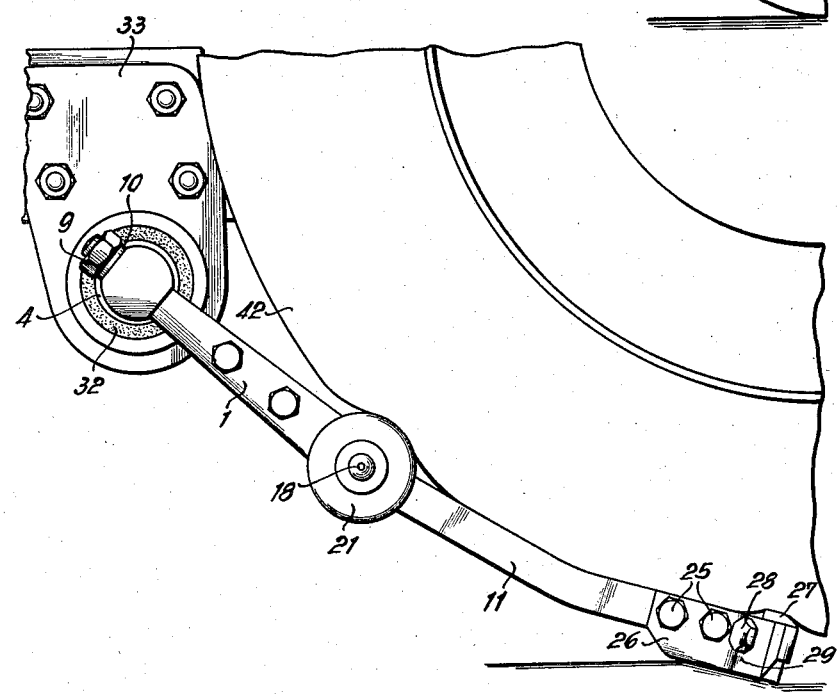
Figure 2 is a view similar to that of Figure 1, showing the emergency brake in its effective position.

The upper arm 1 is connected to the lower arm 11 by means of a joint generally designated 12. According to Figure 3 this joint comprises a bolt 13 provided with lubricating channels 14, 15, and journalled in bearing sleeves 16 and 17, respectively provided in corresponding bores of the arms 2 and 3. The bolt 13 extends to both sides of the arm 1 and has one of its ends provided with a lubricating nipple 18 while the other end of the bolt 13 has connected thereto a washer or disc 19. Mounted between the washer or disc 19 and the outside of the member 3 is a roller 20. This roller is rotatably supported by the bolt 13. A similar roller 21 is mounted on and rotatable about the other end of the bolt 13. As will be seen from the sectioned lower portion of Figure 3 showing the roller 21, a disc 22 is mounted adjacent the member 2 and is rotatable about the bolt 13. Arranged between said disc 22 and the outer wall of the roller 21 is a leaf spring 23, one end of which is connected to a pin 24 which latter is rigidly connected in any convenient manner to the member 2. The other end of the leaf spring 23 is connected to the bolt 13 which latter is rigidly connected to the lower arm 11 in any convenient manner. The leaf spring 23 has the tendency to maintain the lower arm 11 drawn up to the upper arm 1 as close as possible as illustrated in Figure 1. This means that the leaf spring 23 will be tensioned to the extent the angle between the lower arm 11 and the upper arm 1 is increased during the operation of the device.

The lower end of the lower arm 11 has connected thereto, for instance by bolts 25, bent arms 26, the outer ends of which are interconnected by a connecting bar 27 which may be welded thereto. Connected to each of the bent arms 26, for instance by means of bolts 28, is a braking blade or knife 29, the shape of which is particularly clearly shown in Figure 3a. These braking blades or knives are adapted, when the lower arm 11 is pressed against the ground, to cut into the ground or ice, respectively. The lower arm 11 is furthermore provided with another blade or knife 30 which is intended to prevent lateral skidding of the vehicle.

The hollow shaft 4 is journalled in bearings 31 (one only being shown) preferably of pressed material. These bearings are supported by rubber bushings 32 which in their turn are mounted in a bearing plate 33 connected in any desired manner to the frame or chassis of the vehicle. Screws 4a mounted in the hollow shaft 4 are provided for preventing the hollow shaft 4 from moving in its longitudinal direction. It is of course understood that, instead of the screws 4a, a spring washer, disc, or the like could be provided. At substantially the central section of the hollow shaft 4 there is provided a pulley 34 connected to the hollow shaft in any desired manner, for instance by a bolt 35 extending through the pulley and the shaft. The pulley 34 has wound therearound a cable 36, one end of which is connected to a turn-buckle 37 which in its turn has connected thereto a ball 38 adapted to be engaged by a manually operable lever 39 which is adapted to be pivoted about the pivot 40. The other end of the cable 36 is connected to one end of a spring 41 which has the tendency to pull the cable 36 toward the right with regard to Figure 4 but is adapted to yield when the lever 39 is moved in the direction of the arrow A of Figure 4.

*Operation*

It may be assumed that the brake is in its inoperative position shown in Figure 1 while the vehicle is driving over an icy road and suddenly begins to slide. In order now to make the emergency brake effective, the operator actuates the hand lever 39 by shifting the same in the direction of the arrow A of Figure 4. As a result thereof, the lower end of the lever 39 engages the ball 38 and pulls the cable 36 toward the lever with regard to Figure 4 against the thrust of the spring 41. As a result of this actuation of the lever 39, the pulley 34 rotates in anticlockwise direction with regard to Figure 4 so that the hollow shaft 4 rigidly connected thereto turns in the same direction. Inasmuch as the upper arm 1 of the braking device is rigidly connected to the hollow shaft 4, also the upper arm 1 will turn in anti-clockwise direction with regard to Figure 1. While the upper arm 1 is thus moving in this direction, it carries along the lower arm 11 until the free end of the latter, i. e., the connecting bar 27, engages the tread area of the tire 42. Further shifting movement of the lever 39 in the direction of the arrow A causes the tire 42 to spread the lower arm 11 away from the upper arm 1, thus rolling up on the lower end of the lower arm 11 and pressing the blades of the lower arm 11 firmly into the ice while the rollers 20 and 21 are rolling on the tread area of the tire. It will be appreciated that in this way the full load on the tire presses the lower end of the lower arm 11 firmly against the ground and thus exerts a maximum of braking power which is directly conveyed to the frame or chassis of the vehicle by the braking arms 11, 1, and the hollow shaft 4.

When the braking operation has been terminated, it is merely necessary to drive the vehicle backwards to such an extent that the lower end of the lower braking arm 11 is freed from the pressure exerted thereupon by the tire, whereupon the strong spring 41 in cooperation with the two leaf springs 23 will automatically cause the lower arm and the upper arm to spring back to their inoperative positions.

Numerous tests with standard built vehicles have proved that the brake according to the invention is extremely effective and that the braking distance necessary to stop a vehicle while skidding on ice is hardly greater than the braking distance necessary to brake the same vehicle on an ordinary dry street. The new emergency brake is so arranged that, if desired, during the summer months the upper and lower arms may easily be removed from the vehicle without affecting the other parts of the brake installation.

*Modifications*

While, according to the embodiment shown in Figures 1 to 4, the spreading of the lower arm 11 from the upper arm 1 is effected by cooperation of the lower arm 11 with the tire only, it is also possible to provide for positive spreading of the arm 11 from the arm 1. Such an arrangement is shown in Figure 5 in which a segment shaped member 43 is rigidly connected to the hollow shaft 4, preferably between the members 2 and 3. Furthermore, a bell crank lever generally designated 46 is mounted on the bolt 13 preferably between one of the members 2 or 3 and the inner end of the lower arm 11, the arrangement being such that the bell crank lever is rotatable about the bolt 13. The upper arm 46b of the bell crank lever 46 is provided with an opening 45 engaged by one end of a cable 44, the other end of which is connected in any convenient manner to the segment shaped member 43. It will be obvious that, when the shaft 4 is turned in clockwise direction with regard to Figure 5, the segment shaped member 43 will likewise turn in clockwise direction and will by means of the cable 44 actuate the bell crank lever 46 so as to cause the arm 46a thereof to act upon the lower arm 11a, thereby spreading the same away from the upper arm 1a. When the braking operation has been completed, the spring returning the hollow shaft 4 to its initial position also will return the segment shaped member 43 to its initial position, thereby allowing return of the lower arm 11a to its inoperative or Figure 5 position.

If desired, the emergency brake according to the invention may be connected with the circuit for the stop light 47 as illustrated in Figure 7, so that actuation of the lever 39 for applying the brake will cause the lever 48 to close the circuit for the stop light 47.

In some instances it may be desirable to actuate the emergency brake according to the invention from different points of the vehicle. This may be particularly advantageous in connection with military vehicles so that, when the driver is wounded or killed, another person in the vehicle could immediately stop the same. Such an arrangement can be effected as diagrammatically illustrated in Figure 8. According to Figure 8 there is provided, for instance, in addition to the lever 39, an additional lever 49 which is connected to the cable or cable actuating members at a point different from the connecting point of lever 39 with the cable or elements connected thereto.

It will also be obvious that the actuation of the brake according to the invention is not limited to mechanical actuating means but, if desired, may be effected electrically, for instance, by relays, hydraulically as shown in Figure 9, or pneumatically as shown in Figure 10. In Figure 9 the reference numerals 50 and 50a designate hydraulic cylinder piston assemblies operable by the levers 51, 51a, while the cylinder piston assembly 52 is adapted to be actuated by hydraulic pressure from the cylinder piston assemblies 50, 50a, and is operatively connected to the shaft 4.

Similarly, according to the arrangement of Figure 10, air under pressure enters the conduit system generally designated 53 at 54 from where it passes into the actuating cylinders 55, 55a. Actuation of these last-mentioned two cylinders by the levers 56, 56a, will bring about actuation of the main operating cylinder piston assembly 57 which is operatively connected with the shaft 4.

While the blades and knives described in connection with Figure 3 have proved most effective in connection with the braking device according to the invention, there may in some instances also other means, such as chains, be used. To this end, the bent arms 26 may be replaced by straight arms as shown in Figure 6, while their connection with the lower arm 11 may be the same as shown in Figure 3. Chains may then be suspended between the straight arms 58.

A particular advantageous construction for using chains is illustrated in Figure 12. As will be seen therefrom, two arms 59, 60 are rigidly connected in any desired manner to the bolt 61 which may be of the same type as the bolt 13 shown in Figure 3. Rotatably mounted on the bolt 61 are members 2a, 3a, which correspond to the members 2 and 3 of Figure 3. The bolt 61 is surrounded by a coil spring 62 having one end connected to the arm 3a while the other end of spring 62 engages a pin 63 carried by the bolt 61. The coil spring 62 in this arrangement takes the place of the leaf spring 23 of Figure 3 and likewise tends to maintain the arms 59, 60 lifted into close proximity to the members 2a and 3a. The operation of the arrangement shown in Figure 12 corresponds to that described in connection with Figure 3.

While in the arrangement described so far both the upper and the lower arm of the braking device are rigid elements, it may, in some instances, be advisable to have at least one of these two arms designed in such a manner that they can yield to shock to a certain degree. Thus, an arrangement of the type shown in Figure 11 may be selected, which shows the upper arm sub-divided into two elements 64, 65, of which the member 65 is telescopically mounted in the element 64. Spring means 66, 67, are provided which tend to hold the element 65 in its normal position. A spring 68 has one end of a cable 69 connected thereto, which cable passes around a pulley 70, and has its other end connected with an actuating lever 71. The operation of the arrangement shown in Figure 11 is again substantially the same as described before in connection with other embodiments of the invention.

While, when applied to passenger cars, the brake according to the invention is preferably arranged in the manner shown in Figure 1, it is possible and even preferable, when outfitting trucks with a braking device of the invention, to arrange the braking device in such a manner that it will be offset by 90° with regard to the arrangement shown in Figure 1 in clockwise direction so that weaker retraction springs will suffice.

Furthermore, when retaining the brake according to the invention during the summer, guiding blades or knives 30 will suffice while the blades or knives 29 could be discarded.

It is, of course, understood that the present invention is by no means limited to the specific embodiments shown in the drawings but also comprises any modifications within the scope of the appended claims. It should also be kept in mind that, while the invention has been described in connection with land motor vehicles, it is also applicable to airplanes, and that the term "vehicle" as used in the claims is intended to comprise land vehicles and airplanes.

What I claim is:

1. A braking unit adapted to be mounted in front of a wheel of a wheeled vehicle, comprising: an upper arm means pivotably mounted at one end thereof for rotation toward said wheel and normally extending away from said wheel, a lower arm means pivotably joined at one end thereof to the free end of said upper arm means and normally extending toward said wheel, said lower arm means having mounted at the free end thereof a friction means for engaging said wheel, a second means for engaging said wheel, said second means being mounted at the point of joinder of said upper arm means and said lower arm means, said unit when in inoperative position being spaced from said wheel, said unit being rotatable toward said wheel into an actuating position in which said friction means engages said wheel, said unit being further movable by action involving rotation of said wheel into an operative position in which said friction means is interposed between said wheel and the roadbed over which said vehicle is travelling, and in which operative position said second means is in engagement with said wheel, and means for rotating said unit into said actuating position.

2. A braking unit according to claim 1 in which said unit is provided with yielding spring means interconnecting the upper and lower arm means, said spring means continuously urging the lower arm means toward and tending to hold same adjacent to said upper arm means.

3. A braking unit according to claim 1 in which the friction means comprises braking knives having their edges arranged for engagement with the roadbed.

4. A braking unit according to claim 3 in which the knives are so positioned that when contacting the ground they have their major surfaces substantially vertical to the ground and having the planes in which the major surfaces are located intersecting each other.

(References on following page)

References Cited in the file of this patent

UNITED STATES PATENTS

| | | |
|---|---|---|
| 1,148,047 | Ray | July 27, 1915 |
| 1,551,987 | Garland | Sept. 1, 1925 |
| 1,885,120 | Lombardi | Nov. 1, 1932 |
| 1,990,101 | Smith | Feb. 5, 1935 |
| 2,562,521 | Blattner | July 31, 1951 |
| 2,605,860 | Smith | Aug. 5, 1952 |
| 2,645,309 | Grotz | July 14, 1953 |
| 2,648,402 | Leslie | Aug. 11, 1953 |
| 2,775,314 | Hiemstra | Dec. 25, 1956 |

FOREIGN PATENTS

| | | |
|---|---|---|
| 674,698 | France | Jan. 31, 1930 |
| 779,623 | France | Jan. 19, 1935 |
| 13,961 | Great Britain | Sept. 28, 1888 |